Feb. 20, 1968 M. WEISS 3,369,629
FOLDABLE BATTERY POWERED CART
Filed Oct. 23, 1965 2 Sheets-Sheet 1
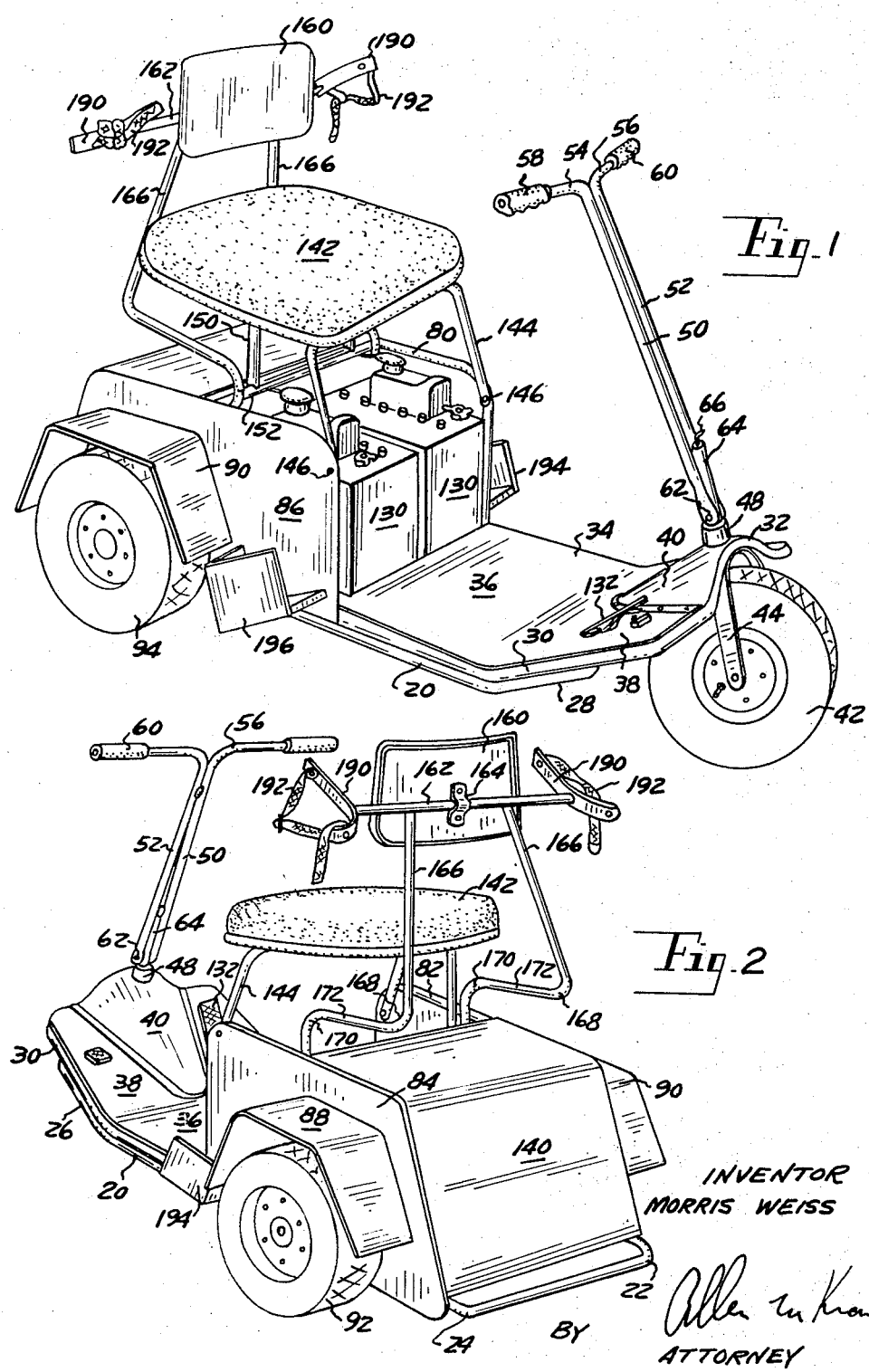
INVENTOR
MORRIS WEISS
BY
ATTORNEY

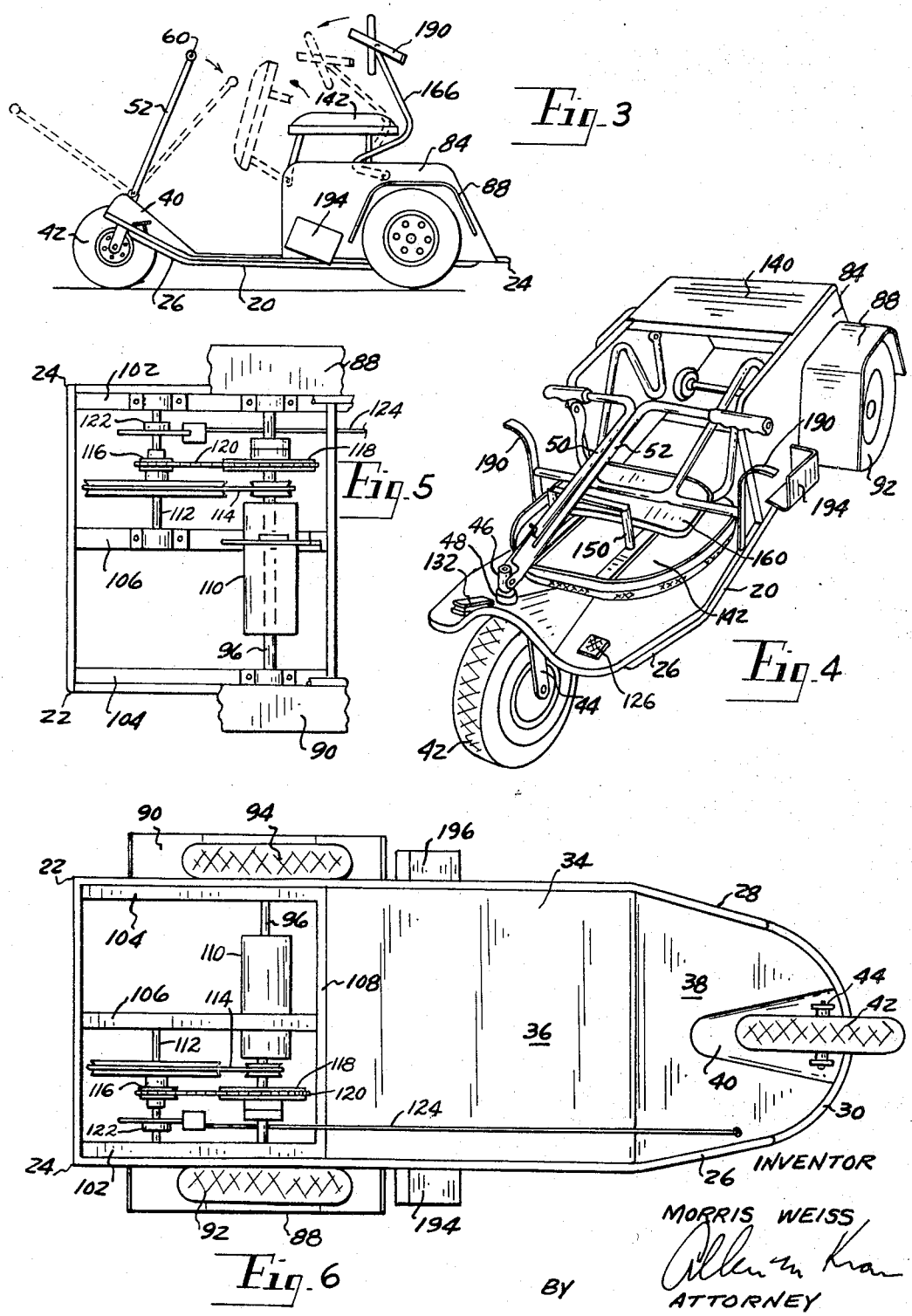

United States Patent Office 3,369,629
Patented Feb. 20, 1968

3,369,629
FOLDABLE BATTERY POWERED CART
Morris Weiss, Oak Park, Mich., assignor to Fore Motor Cart Company, Detroit, Mich., a corporation of Michigan
Filed Oct. 23, 1965, Ser. No. 503,273
5 Claims. (Cl. 180—27)

ABSTRACT OF THE DISCLOSURE

A self-propelled vehicle which has a seat and backrest independently foldable forwardly and a steering column foldable rearwardly over the folded seat and backrest to achieve a small package for storage and transportation.

This invention relates to a small three-wheeled vehicle powered by a battery and driven by an electric motor, which is designed for carrying a single person over relatively short distances from a battery charging station at relatively low speeds and is thus particularly adapted for such uses as carrying players about a golf course, transporting workers about industrial sites, and the like.

The invention more particularly relates to such a cart wherein the primary structural members, such as the frame, steering column and the seat and back rest support are formed of steel tube and are affixed to one another in a pivotable manner so that they may be folded into a compact package wherein the cart has a minimum volume, for purposes of transporting the cart between points of use, and more particularly for transporting the cart within the trunk of an automobile so that it may be carried to points of use.

As disclosed in the following detailed description of the perferred embodiment of the invention, the cart is constructed about a frame of steel tubing bent and welded into a generally elongated rectangular shape. One of the short ends of the rectangle is generally rounded and tapered and supports the single forward wheel of the cart on a pivotable mount. The front wheel mount extends up through the base and projects a short distance above. An elongated steering column formed of a pair of joined tubes is pivotably trunnioned to this front wheel mount so that it may be supported in either an upright position wherein it serves as a steering column or may be folded downwardly so as to extend perpendicularly to the mount and parallel to the base. In this later position it may be aligned closely with the base for storage and transportation purposes or it may be inclined forwardly with respect to the cart so that the cart may be pulled by hand through the steering column. The upper side of the rear end of the frame supports a generally cubical steel tubular drive housing. This housing is fixed with respect to the frame and carries the storage batteries, the drive motor, the rear axle assembly and the brake. A pair of rear wheels project outwardly from the sides of the housing on the ends of the axle. The upper side of the cubical drive housing pivotably supports a seat member on its upper forward edge. Its pivotable mount allows the seat member to be supported in either an operating position wherein it extends parallel to the upper surface and above the drive housing and provides a seat for a driver whose legs extend down the forward side of the housing and are supported on the base, or into a storage position wherein the seat is in direct abutment to the base. A backrest member is independently supported by its own pivotable mount which connects to the upper edge of the drive housing toward the rear end thereof. This backrest member may be supported in either an operating position wherein it projects vertically above the rear end of the seat member or in a storage position wherein it folds on top of the seat member, just above the base. When the steering wheel, the seat member and the brackrest member are all folded into a closed position, the cart occupies a volume approximately defined by the outer dimensions of the base and the height of the drive housing and may easily be stored within even a small automobile trunk. The sides of the drive housing retain outwardly extending support members at their forward and lower edges. These support members cooperate with extending side support straps positioned on the sides of the backrest member to retain bags of golf clubs adjacent to the sides of the cart with their lower ends abutting the support members and their upper edges strapped within the side supports.

It is therefore seen to be a primary object of the present invention to provide a three-wheeled cart for a single passenger which is constructed about an elongated, horizontal base member, has an upwardly projecting drive housing mounted on the rear end of the base member and has a foldable steering column connected to the single front wheel and foldable seat and backrest members connected to the upper side of the drive housing.

Another object is to provide such a cart wherein the steering column, seat and backrest members may be folded into closed position over the forward end of the base so that they occupy a height no greater than that of the drive housing.

Another object is to provide such a cart wherein the major components are formed of tubular steel in an economic, efficient, and reliable manner.

Other objects, advantages and applications of the present invention will be made apparent by the following detailed description of a preferred embodiment of the invention. The description makes reference to the accompanying drawings, in which:

FIGURE 1 is a perspective view of a preferred embodiment of the cart, particularly adapted for golfing purposes, viewed from a forward corner thereof;

FIGURE 2 is a perspective view of a preferred embodiment of the cart viewed from the rear corner thereof;

FIGURE 3 is a side view of the cart illustrating the folded positions of the steering column, seat and backrest member by phantom lines;

FIGURE 4 is a perspective view from the front corner thereof, of the cart shown in a folded position for storage purposes;

FIGURE 5 is a plan sectional view of the drive housing assembly with the rear cover removed; and FIGURE 6 is a view of the bottom of the cart.

Referring to the drawings, the base of the vehicle is formed about a pair of framing tubes. The rear tube 20 (FIGURE 6) is bent into a U-configuration with its two corners 22 and 24 defining the rear edge of the frame and its two legs defining the sides of the major portion of the base. The member 20 lies in a single plane except for its upwardly inclined forward edges 26 and 28. These forward edges as well as a portion of the center section of the legs of the U overlap the rear extensions of a generally U-shape forward frame member 30 also formed of bent tubing. The forward frame member 30 is also generally U-shaped and its side legs are bent to conform with the end shape of the legs of the rear base frame member 20. The base of the section 30 is bent upwardly out of the general plane of the base as at 32 to provide a forward wheel well.

The forward portion of the frame is covered by a sheet metal base 34 which extends between the side legs of the frame members 20 and 30. The base 34 has a flat section 36 which extends over the center section of the cart and an upwardly inclined section 38 which extends between the upwardly inclined ends 28 of the rear frame members and the balance of the section of the forward frame members 30. A convexly curved forward wheel well section 40 having a generally V-shape is supported at the forward edge of the base in the center of the upwardly inclined section 38, with its gently rounded apex pointing toward the rear of the vehicle. The forward edge of this wheel well section 40 is joined to the upwardly rounded curve 32 and the forward frame member to form a well for the single front wheel of the vehicle 42. This wheel is rotatably mounted in a U shaped trunnion support 44. A short shaft 46 is journaled in a bearing 48 retained in the wheel housing 40 and projected downwardly through the wheel housing to fix to the top of the trunnion mount 44.

The steering column consists of a pair of steel tubes 50 and 52 welded together along the major portion of their length. At this top end the tubes are bent normally away from one another as at 54 and 56 and their extreme ends are equipped with handle grips 58 and 60 to form a steering handle for the vehicle. The lower ends of the two tubes 50 and 52 are flattened and joined to the flattened sides of the shaft 46 by a pin 62. As is best seen in FIGURE 4 the lower end of the shafts 50 and 52 immediately above their pin connection with the shaft 46, support a spring actuated plunger member 64 which has a downwardly biased rod 66 that normally locks in a central hole 68 formed in the top of the shaft 46. As is seen in FIGURE 3 when the plunger 66 is lifted out of the hole 68 the steering column 50 and 52 may be pivoted about the pin 62 into either a folded position, shown in FIGURE 4, wherein it lies horizontally over the other folded members of the vehicle; a forward position wherein it extends in front of the vehicle and allows the vehicle to be towed by hand, or an upright position wherein the plunger 66 is locked in the hole 68 and serves as a regular steering column to control the angular position of the forward wheel 42.

The rear housing of the frame is formed about a pair of inverted, generally U-shaped tube members 80 and 82. They are disposed on opposite sides of the frame with their rearward ends being welded to the frame member 20 just forward of its two rearward corners 22 and 24. Their forward edges are welded to the top of the rear edges of the frame member 30 adjacent to the midsecton of the cart.

The rear frame members 80 and 82 are covered with sheet metal side panels 84 and 86 which have sheet metal fenders 88 and 90 projecting outwardly from their sides to cover the rear wheels of the vehicle 92 and 94. These wheels are fixed to the ends of a shaft 96 that is journaled in a pair of bearing blocks 98 and 100 fixed to elongated metal plates 102 and 104 which extend along the rear sides of the frame member 20. A similar bar 106 extends between the bars 102 and 104 and terminates at a forward transverse bar 108 which forms the forward point of the rear housing.

An electric motor 110 is supported below the shaft 96 and drives a stub shaft 112 through a belt and pulley drive 114. The stub shaft has a smaller pulley 116 that connects to a pulley 118 connected on the main shaft through a belt 120 to provide a speed reduction. The stub shaft 116 is also equipped with a brake 122 that may be actuated through a cable 124 from a pedal 126 in the front of the vehicle. The motor 110 is appropriately powered through batteries 130 stored above the members 102, 104, and 106 within the rear framework through an accelerator type control switch 132. It should be understood that the exact configuration of the drive system is not critical to the present invention and the drive might take a variety of forms within the framework of the invention.

The rear side of the upper frame is covered by sheet metal member 140 that extends between the frame members 80 and 82 over the back and the rear portion of the top. The forward portion of the top is open and normally covered by a padded seat member 142 which is generally rectangular in shape and is supported on its forward side by an inverted U-shaped tubing member 144 having its center section welded to the underside of the seat and its forward ends pivotably supported at joints 146 formed on the frame members 80 and 82 just below their forward downward curves. This pivotable connection allows the seat member to be pivoted between a lowered position wherein its top side abuts the upper surface of the sheet metal base cover 34 and an operative position shown in FIGURES 1 and 2. The intermediate position is illustrated in phantom lines in FIGURE 3. When in its operative position, a downwardly directed frame member 150, which projects from the center of the seat, engages an upper cross bar 152 welded transversely across the upper side of the frame between the members 80 and 82. The member 150 has a concave surface on its lower end which mates with the center section of the bar 152 to provide secure alignment. When the unit is in the folded position, the steering column 50 rests on top of the support member 155. The unit is provided with a padded backrest 160 which presents a gently concave surface above the rear of the seat 142 when the seat is in an operating position. The backrest is supported on a horizontal bar 162 which is retained to the rear of the backrest by a clamp 164. As may be seen in FIGURE 3 the clamp 164 allows the backrest 160 to pivot about the horizontal member 116 to provide a comfortable fit with the back of an occupant.

The horizontal tube 162 is joined to the upper ends of a pair of backrest support members 166. The members 166 are each bent as at 168 and bent again as at 170 to provide horizontal sections 172 which carry the tubes forward of the cover 140 and then join to support sections 174 which project under the cover 140 (FIGURE 4) and are pivotally attached to the side walls 84 and 86. These pivotable connections allow the seat 142 to be moved from its operating position, as shown in FIGURES 1 and 2, through an intermediate position, shown in FIGURE 3, to a storage position, shown in FIGURE 4, wherein it lies directly over the normal underside of the seat 142.

The ends of the horizontal back support members 162 project outwardly beyond their connections with the upper ends of the tubes 166 and support carrier members 190 adapted to retain the upper ends of golfbags. The carrier members are bent into a general L-shape and contain separable straps 192 which are adapted to connect their two ends. The lower sides of the panels 84 and 86 just forward of the fenders 88 and 90 carry supports 194 and 196 adapted to retain the lower ends of golfbags. These supports comprise three plates disposed at right angles to one another. The lower plate is inclined with respect to the horizontal surface to extend transversely to a line in the direction of the supports 190.

The cart as described, is useful for traversing a golf course and may be conveniently folded into the position shown in FIGURE 4 wherein the seat 140 to the backrest 160 and the steering column 50 are supported above the floor panel 36 forward of the rear assembly for storage within the trunk of a normal automobile.

The unit is equally useful as a conveyance within large plants and factories, although the golfbag support members are not useful in such application and may be removed. The folding characteristics of the cart are equally useful as a plant transportation vehicle as the units may be readily folded for storage purposes or for transporting between plants or between plants and maintenance centers.

Having thus described my invention, I claim:

1. A vehicle of the type described, comprising: an elongated lower frame; at least one front wheel rotatably supported with respect of the frame; a steering column pivotally connected to said wheel and being disposable in a first, generally upright position, wherein it is useful in steering said wheel or a second, folded position wherein it lies parallel to said lower frame; a rear upper frame attached to the lower frame and a seat member pivotally supported on the upper frame so as to be disposable in a first operative position wherein the seat member is supported in a generally horizontal attitude above said upper frame of a second, folded position wherein said seat member is disposed adjacent to and parallel to the forward section of said lower frame in contact with said steering column member when such last said member is in its folded position; a backrest member pivotably supported by said rear frame which may be positioned in either a first, operative position wherein it is disposed to the rear of and above said seat member or a second, folded position wherein it is disposed in proximity to the forward section of the lower frame in contact with said seat member in that member folded position.

2. The vehicle of claim 1 wherein the vehicle has a pair of rear wheels powered by a motor disposed within the rear upper frame.

3. A vehicle of the type described, comprising: a first, generally rectangular, lower frame; a single forward wheel pivotably supported below the forward end of the frame; a steering column connected to said wheel, at the upper side of the lower frame by a pivotable connection which allows the steering column to be disposed in a first, operative position, wherein it extends generally upwardly from said frame or a second, folded position wherein it lies parallel to and in proximity to said frame; and a generally planar seat member pivotably supported with respect to said lower frame so as to be disposable in a first, operative position wherein it is supported above the rear end of the forward frame in an upright position or a second, folded position wherein it is disposed in proximity to the forward end of the lower frame in an inverted position; a backrest member pivotably supported with respect to the rear end of the lower frame so as to be disposed in a first, upright position wherein it is supported above and to the rear of the seat member, or in a second, folded position wherein it is disposed in proximity to the forward side of the lower frame in contact with said folded seat member.

4. The vehicle of claim 3 wherein an upper frame member is supported above the rear of the lower frame member below the seat member when the seat member is in its operative position.

5. A vehicle of the type described, comprising: a lower frame formed of a pair of generally U-shaped tubes joined together at their open ends and a sheet cover member formed over the forward side of the tubes; a single forward wheel rotatably supported at the forward end of the frame and pivotable about a generally vertical axis and a pair of rear wheels rotatably supported on opposite sides of the rear end of the frame; an elongated steering column connected to said forward wheel by a pivotable joint which allows the steering column to be disposed in a first, generally upright, operative position; or a second, folded position wherein it overlies the forward side of the lower frame; a rear frame disposed above the rear section of the lower frame formed by a pair of inverted, generally U-shaped upright members attached to the rear sides of the lower frame; a seat member pivoted at the front end of said rear frame above said pivotal joint; and whereby said seat member is pivotably supported with respect to the lower frame about a point midway along the length of the lower frame so as to be disposed in a first, operative position wherein it is disposed above and parallel to said rear frame, or a second folded position wherein it is disposed adjacent to the top of the forward side of the lower frame.

References Cited

UNITED STATES PATENTS

| | | | |
|---|---|---|---|
| 2,926,948 | 3/1960 | Koplin et al. | 279—378 X |
| 2,973,048 | 2/1961 | Jensen | 180—27 |
| 3,004,619 | 10/1961 | Straussler | 180—27 |
| 3,043,389 | 7/1962 | Steinberg | 180—27 |
| 3,108,481 | 10/1963 | Westmont. | |
| 3,266,589 | 8/1966 | Harris | 280—278 X |
| 3,279,850 | 10/1966 | Saemann et al. | 297—337 X |

FOREIGN PATENTS 1,011,087   4/1952   France.

KENNETH H. BETTS, *Primary Examiner.*